UNITED STATES PATENT OFFICE.

JOHN G. DUNN AND ALFRED F. HOWES, OF LAWRENCEBURG, INDIANA.

IMPROVEMENT IN THE COMPOSITION OF ENAMELS.

Specification forming part of Letters Patent No. 9,250, dated September 7, 1852.

*To all whom it may concern:*

Be it known that we, JOHN G. DUNN and ALFRED F. HOWES, of Lawrenceburg, county of Dearborn, and State of Indiana, have invented or produced a new and original Enamel for Brick or Iron; and we believe it to be the cheapest, most useful and durable enamel ever used, being ornamental, and rendering brick perfectly impervious to water; and we do hereby declare that the following is a full and exact description of the ingredients which compose said enamel: glass, (containing no lead or tin,) sulphate or oxide of lime, muriate of soda, water, and brown frosting.

*Process of making, applying, and perfecting the said enamel.*—Take of the glass one pound, sulphate or oxide of lime, one fourth of a pound, and muriate of soda one-eighth of a pound, and mix and triturate with water in a mortar. This pour or paint upon the clay brick while wet, and before it is dry sift the brown frosting upon it with a fine sieve, and immediately upon the brown frosting sift of the proportion of glass one pound mixed with one-eighth pound muriate of soda. This being done, the brick is ready for burning, and should be burned until it comes to a white heat. In the same manner iron is enameled.

What we claim as our invention or production, and desire to secure by Letters Patent, is—

The enamel hereinbefore described, and of its application to brick and iron.

JOHN G. DUNN.
ALFRED F. HOWES.

Attest:
S. S. DUNN,
I. CROSBY.